United States Patent
Zalewski et al.

(10) Patent No.: US 9,562,772 B2
(45) Date of Patent: Feb. 7, 2017

(54) METHOD FOR DETERMINING INITIAL DATA FOR DETERMINING POSITION DATA OF A VEHICLE

(71) Applicant: Continental Teves AG & Co. oHG, Frankfurt (DE)

(72) Inventors: Michael Zalewski, Bruchköbel (DE); Klaus Rink, Rodenbach (DE); Marc Menzel, Weimar (DE); Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 18 days.

(21) Appl. No.: 14/650,403

(22) PCT Filed: Dec. 12, 2013

(86) PCT No.: PCT/EP2013/076360
§ 371 (c)(1),
(2) Date: Jun. 8, 2015

(87) PCT Pub. No.: WO2014/095559
PCT Pub. Date: Jun. 26, 2014

(65) Prior Publication Data
US 2015/0330793 A1 Nov. 19, 2015

(30) Foreign Application Priority Data
Dec. 20, 2012 (DE) ........................ 10 2012 223 970

(51) Int. Cl.
*G01C 21/00* (2006.01)
*G01C 21/20* (2006.01)
*G01C 21/16* (2006.01)

(52) U.S. Cl.
CPC ............. *G01C 21/20* (2013.01); *G01C 21/165* (2013.01); *G01C 21/206* (2013.01)

(58) Field of Classification Search
CPC ...... G01C 21/20; G01C 21/206; G01C 21/165
See application file for complete search history.

(56) References Cited

U.S. PATENT DOCUMENTS 5,557,522 A * 9/1996 Nakayama ......... G01C 21/3446
701/410
5,825,283 A * 10/1998 Camhi .................. B60R 25/102
340/438

(Continued)

FOREIGN PATENT DOCUMENTS

DE 102006029148 1/2008
DE 102007051198 5/2008

(Continued)

OTHER PUBLICATIONS

German Search Report for German Application No. 10 2012 223 970.7 mailed Aug. 2, 2013, including partial translation.

(Continued)

*Primary Examiner* — Mary Cheung
(74) *Attorney, Agent, or Firm* — RatnerPrestia

(57) ABSTRACT

A method for determining initial data for determining position data of a vehicle based on driving dynamics data, the method including: assigning a determined environment status at a determined position of the vehicle to the determined position of the vehicle; detecting on environment status; and—using the determined position as initial data if a contrast of the detected environment status and the determined environmental status satisfies a predetermined condition.

12 Claims, 2 Drawing Sheets

(56) References Cited

U.S. PATENT DOCUMENTS

| | | | |
|---|---|---|---|
| 6,349,249 B1 | 2/2002 | Cunningham | |
| 8,571,789 B2 | 10/2013 | Monde | |
| 8,855,867 B2 | 10/2014 | Gunther | |
| 2006/0265166 A1* | 11/2006 | Makela | G01C 21/30 702/95 |
| 2008/0109141 A1 | 5/2008 | Nichols | |
| 2009/0063051 A1 | 3/2009 | Watanabe | |
| 2010/0148947 A1* | 6/2010 | Morgan | B60R 25/04 340/426.22 |

FOREIGN PATENT DOCUMENTS

| | | | |
|---|---|---|---|
| EP | 0952427 | | 10/1999 |
| JP | 0783687 | | 3/1995 |
| JP | 2007003406 | | 1/2007 |
| JP | 2007003406 A | * | 1/2007 |
| JP | 2010025872 | | 2/2010 |
| KR | 1020090048229 | | 5/2009 |
| WO | 2009004749 | | 1/2009 |
| WO | 2011098333 | | 8/2011 |
| WO | 2011141619 | | 11/2011 |

OTHER PUBLICATIONS

International Search Report for International Application No. PCT/EP2013/076360 mailed Apr. 4, 2014.
Japanese Office Action dated May 13, 2016 for Japanese Application No. JP 2015-547023 (3 pages), including English translation (3 pages).

* cited by examiner

METHOD FOR DETERMINING INITIAL DATA FOR DETERMINING POSITION DATA OF A VEHICLE

CROSS REFERENCE TO RELATED APPLICATIONS

This application is the U.S. National Phase Application of PCT/EP2013/076360, filed Dec. 12, 2013, which claims priority to German Patent Application No. 10 2012 223 970.7, filed Dec. 20, 2015, the contents of such applications being incorporated by reference herein.

FIELD OF THE INVENTION

The invention relates to a method for determining initial data for determining position data of a vehicle, a method for determining a position of a vehicle, a control device for implementing the method and a vehicle comprising the control device.

BACKGROUND OF THE INVENTION

DE 10 2006 029 148 A1, which is incorporated by reference, discloses what is known as a strapdown algorithm, which determines the position data of a vehicle on the basis of positioning data and vehicle-dynamics data.

The position data of a vehicle shall be understood below to mean all the data affecting the spatial position of the vehicle. Therefore this data includes the vehicle-dynamics data of the vehicle as well as the positioning data of the vehicle. The vehicle-dynamics data shall be understood to mean all the data that describes the movement of the vehicle.

DE 10 2006 029 148 A1 discloses that in order to implement such methods that determine the position data of a vehicle, then initial data, which is also referred to as an external anchor, is needed.

SUMMARY OF THE INVENTION

According to an aspect of the invention, a method for determining initial data for determining position data of a vehicle on the basis of vehicle-dynamics data comprises the steps:
  associating a defined ambient condition at a defined position of the vehicle with the position of the vehicle,
  detecting an ambient condition, and
  using the defined position as initial data if a comparison of the detected ambient condition and the defined ambient condition satisfies a predetermined condition.

The defined method is based on the consideration that the external anchor mentioned in the introduction could be derived from what is known as a global satellite navigation signal or GNSS signal for short. This external anchor could then be used in the vehicle as the basis either for specifying other data more accurately or even for generating new data. For example, if an absolute position is known from the GNSS signal, the output from the wheel-speed sensors could be checked and hence validated, for instance, using the inertial sensors. Alternatively or additionally, the inertial sensors could be used also to extrapolate the absolute position of the vehicle when the GNSS signal has dropped out, for instance in a tunnel, in order to generate new data for example.

The defined method recognizes, however, that if the vehicle is switched off in a location without GNSS signal reception, for instance such as in the aforesaid tunnel, the absolute position of the vehicle cannot be determined after the restart, because although the inertial sensors can output a position change, without the initial data, i.e. the external anchor, mentioned in the introduction, there is no reference position available that might be updated to the actual position of the vehicle on the basis of the position change detected by the inertial sensors.

Recognizing this fact, the defined method is based on the consideration that at least one position is saved as the external anchor, and this position is used as the reference position for extrapolation on the basis of the position change detected by the inertial sensors. This external anchor is only useful, however, if it is established that the vehicle is also actually located in a position that corresponds to the external anchor. The best way that this could be verified would be using an ambient condition that is associated with the external anchor.

An ambient condition shall be understood below to include all the measurable features in a surrounding area of a position suitable as an anchor. This may be image features, temperature features, just color features and/or other features.

It is now proposed in the defined method to associate the external anchor, as a defined position, with an ambient condition that corresponds to the ambient condition at the defined position. When the vehicle is started, if there is no GNSS signal available, the ambient condition around the vehicle can now be detected, and the external anchor can be used if the detected ambient condition matches the ambient condition associated with the external anchor, thereby creating a basis for determining the position of the vehicle even when a GNSS signal is not available.

In principle, any external anchors can be used here. For a vehicle that is used, for example, for commuting between a workplace and home, an ambient condition around a parking space at the workplace and an ambient condition around a parking space at the home can be saved in a memory as external anchors. When the vehicle is restarted, the actual ambient condition around the vehicle can then be detected. If the actual ambient condition around the vehicle matches one of the two saved ambient conditions, then the external anchor and hence the initial data of the vehicle can be set to the specific position of the vehicle at this point.

In addition, it would not be absolutely necessary to fix the aforesaid check to the time of the vehicle restart. For instance, if there is a characteristic ambient condition in an indoor carpark, such as a specific barcode on the roadway surface for example, then the external anchor can be set to the position of the barcode at the time when the vehicle establishes that it is passing the barcode by detecting the ambient condition.

In a development of the invention, the defined position of the vehicle is a position at which the vehicle is switched off. In other words, the association of the defined position, which is acting as the external anchor and hence as the initial data, does not take place until the vehicle is switched off at a destination position. Switching-off shall be understood to mean below the vehicle stopping and system components of the vehicle being switched off, so that it is no longer possible to determine the position of the vehicle and hence an unintentional movement of the vehicle, for example by the vehicle being towed away. By associating the position of the vehicle at which it is switched off with the ambient condition at this position, it can be established directly after the system restart whether the vehicle has moved in an unknown manner and whether the previously saved position of the vehicle as the external anchor and hence the initial data is still up to date.

For this check, the detected ambient condition after the switching-off and a system restart of the vehicle should be detected directly at the defined position. A plausibility check can thereby be performed after the system restart on the association made immediately before switching off the vehicle between the saved position and the saved ambient condition.

In a particular development of the defined method, the ambient condition comprises at least a portion of an image of a surrounding area of the vehicle. An image shall be understood below to mean a volume grid viewed from the vehicle, preferably however a surface grid, the individual grid points of which being assigned measured values that are detected at the position of the vehicle using sensors, for example, from the vehicle. These measured values may be distance values, pixel values, temperature values and/or any other measured values. The image of the surrounding area of the vehicle provides a practically unique identification of the position at which the vehicle is located, so that it is unlikely that two different positions can be associated with one and the same image.

In a preferred development of the defined method, the portion of the image of the surrounding area of the vehicle is detected by surround sensors. Such surround sensors, such as a camera or a distance sensor, are present anyway in modern vehicles, and therefore the defined method can be implemented in a vehicle without major hardware conversion measures.

In an additional development of the defined method, the portion of the image of the surrounding area of the vehicle can be detected in a plane outside a movement plane of the vehicle. This development is based on the consideration that the surrounding area of the vehicle might also contain other vehicles or moving objects that modify the ambient condition and hence the image of the surrounding area of the vehicle. These moving objects, however, normally move in the same movement plane as the vehicle, so that, for example, detecting the floor or detecting the ceiling of an indoor carpark as the image of the surrounding area of the vehicle should largely avoid this disadvantage.

In another development of the defined method, the portion of the image of the surrounding area of the vehicle is detected by means of object recognition. Objects in the surrounding area can be classified by this means and hence eliminated as unsuitable for determining the image of the surrounding area of the vehicle. For example, if another vehicle is recognized then it can be excluded from the definition of the image of the surrounding area of the vehicle, because it is likely that the vehicle will move off at some point and hence will modify, i.e. corrupt, the image around the vehicle.

According to another aspect of the invention, a method for determining a current position of a vehicle comprises the steps:
  acquiring initial data using a defined method,
  acquiring vehicle-dynamics data, and
  determining the current position by extrapolating the initial data on the basis of the vehicle-dynamics data.

According to a further aspect of the invention, a control device is designed to implement a method as claimed in any of the previous developments.

In a development of the defined control device, the defined device comprises a memory and a processor. In this development, the defined method is stored in the form of a computer program in the memory, and the processor is intended to execute the method when the computer program is loaded from the memory into the processor.

According to a further aspect of the invention, a computer program comprises program code means in order to implement all the steps of one of the defined methods when the computer program is executed on a computer or on one of the defined devices.

According to a further aspect of the invention, a computer program product contains a program code which is stored on a machine-readable data storage medium and which implements one of the defined methods when it is executed on a data processing device.

According to a further aspect of the invention, a vehicle comprises a defined control device.

BRIEF DESCRIPTION OF THE DRAWINGS

The above-described properties, features and advantages of this invention, and the way in which they are achieved, are elucidated and explained more clearly by the following description of the exemplary embodiments, which are explained in greater detail in conjunction with the drawings, in which.

DETAILED DESCRIPTION OF THE INVENTION

In the figures, the same elements are denoted by the same reference signs and are described only once.

Figure 1:
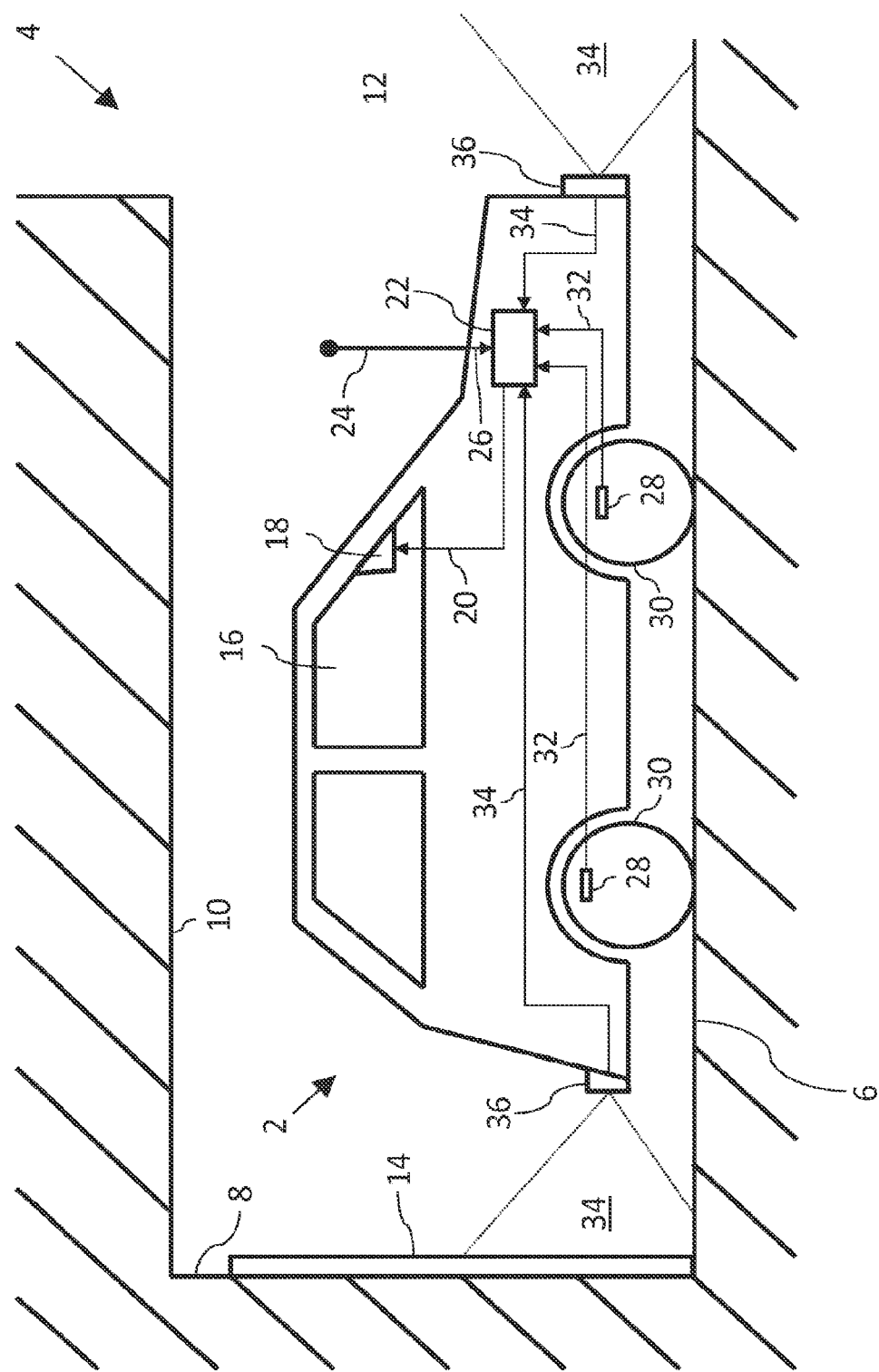
FIG. 1 is a block diagram of a vehicle in an indoor carpark parking space.

Reference is made to FIG. 1, which shows a block diagram of a vehicle 2 in an indoor carpark parking space 4.

In the present embodiment, the indoor carpark parking space 4 is part of an indoor carpark, which is not shown in greater detail. The indoor carpark parking space 4 comprises a parking space floor 6, a parking space wall 8, a parking space ceiling 10 and a parking space entrance 12 via which the vehicle 2 can drive into or out of the indoor carpark parking space 4.

In the present embodiment, a panel 14 containing a picture, which is not shown in greater detail, is mounted on the parking space wall 8.

In the present embodiment, the vehicle 2 comprises a vehicle interior 16, in which is arranged a navigation device 18 known per se for displaying an absolute actual position 20 of the vehicle 2.

The absolute actual position 20 is output by a position-determining unit 22. The position-determining unit 22 comprises for this purpose an antenna 24, which the unit can use to receive global satellite navigation signals 26 known per se, referred to below as GNSS signals 26, such as GPS signals for instance, and from which can determine the absolute actual position 20 of the vehicle 2 in a known manner.

If, however, no GNSS signal is received via the antenna 24 because all the GNSS signals are shielded, for example in the indoor carpark by the parking space ceiling 10, then the position-determining device can, for instance, use the strapdown algorithm disclosed in DE 10 2006 029 148 A1 to extrapolate the absolute actual position 20 also on the basis of a relative position change of the vehicle 2 and the last known absolute actual position 20.

In order to determine the relative position change, the vehicle 2 in the present embodiment comprises inertial sensors (not denoted by reference signs), which output accelerations and yaw rates, and wheel-speed sensors 28, which are arranged on the wheels 30 of the vehicle and output the speeds 32 of the wheels 30. The accelerations and yaw rates from the inertial sensors and speeds 32 can be used to determine the relative position change of the vehicle 2, for example in the manner disclosed in DE 10 2006 029 148 A1, and a current absolute actual position 20 can thereby be determined on the basis of a last known absolute actual position 20.

After a system restart of the vehicle 2, however, a last known actual position 20 is not normally available. Although the last known actual position 20 prior to the system restart of the vehicle 2 could be used, if during the system switch-off and the system restart the vehicle 2 is towed out of the indoor carpark parking space 4, for example, by towing away, then the last known actual position 20 prior to the system restart is no longer valid and would result in an incorrect actual position 20.

Therefore the present embodiment proposes performing after a system restart a plausibility check on the last known actual position 20, which was determined prior to the system restart.

For this purpose, surround sensors in the form of cameras 36 are used in the present embodiment to detect and save an ambient condition around the vehicle 2 in the form of an image 34 around the vehicle 2 at the time when the last known actual position 20 is determined. After the system restart, the saved image 34 around the vehicle 2 is then compared with a current image 34 around the vehicle 2. If both images 34 are identical same (which can be determined, for example, using an error threshold, which is described later), it is then identified that the vehicle 2 is still standing in the same position, and the last known actual position 20 is enabled as the starting point for determining new actual positions, for example on the basis of the aforesaid strapdown algorithm.

Figure 2:
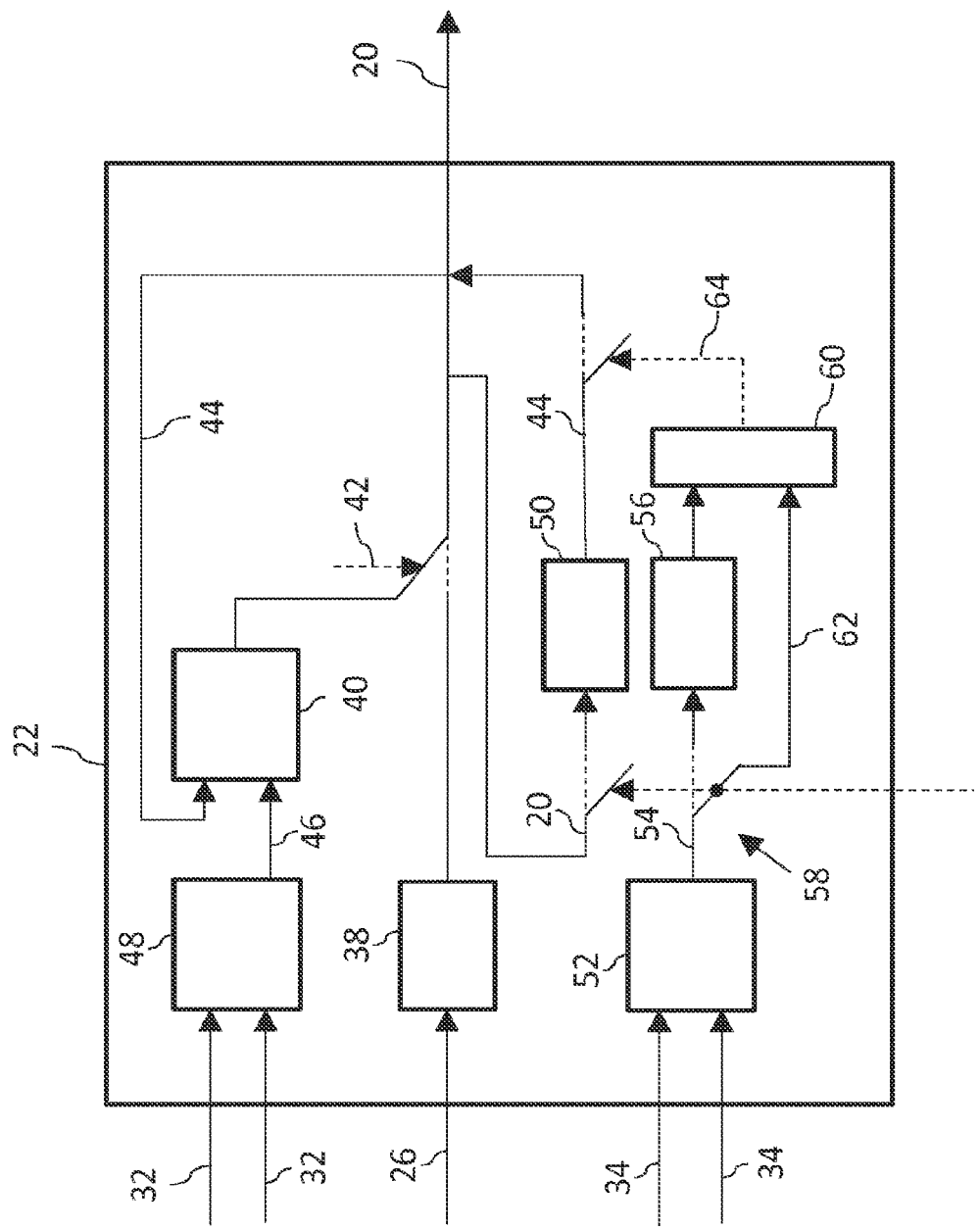
FIG. 2 is a block diagram of a position-determining unit in the vehicle of FIG. 1.

This shall be explained in greater detail with reference to FIG. 2, which shows a block diagram of a position-determining unit 22 in the vehicle 2 of FIG. 1.

In the present embodiment, the position-determining device 22 can determine the actual position 20 of the vehicle 2 either, on the basis of a trilateration of the GNSS signal 26 in a triangulation unit 38 in a manner known to a person skilled in the art and/or on the basis of the above-mentioned strapdown algorithm in an iteration unit 40.

In addition, the output signal from one of the two units 38, 40 is selected in the present embodiment by means of a control signal 42, which can be generated, for example, on the basis of the availability of the GNSS signal 26.

Alternatively, the output signals from the two units 38, 40 could also be filtered with respect to one another in a manner not shown in greater detail in order to determine, for example, a tolerance in the actual position 20 of the vehicle 2. WO 2011/098 333 A1, which is incorporated by reference, contains details of this, for example. Filtering the two output signals can include a comparison of both output signals. This comparison can be performed, for instance, by a pure averaging process without also taking into account other factors such as noise. If the noise is meant to be included as well, a state observer or a Kalman filter could be considered for the filter. If the form of the noise is also meant to be taken into account, a particle filter could be used, if applicable, that has a basic set of available noise scenarios and which selects by a Monte Carlo simulation, for example, the noise scenario to be included in the elimination process.

In order to calculate a current actual position 20 as part of the strapdown algorithm, the abovementioned iteration unit 40 requires initial data 44, which describes an actual position 20 of the vehicle 2, on the basis of which a new actual position 20 of the vehicle 2 shall be calculated. In addition, the iteration unit 40 needs a position change 46 of the vehicle 2, which in the present embodiment is determined by a position-change calculation unit 48 on the basis of the wheel speeds 32.

The aforesaid initial data 44 must not be chosen arbitrarily. Instead it must describe an actual position 20 of the vehicle that is as up-to-date as possible, with the error in said position lying in the range of the position change 46 of the vehicle 2 calculated by the position-change calculation unit 48. If the error in the initial data 44 is larger, the actual position 20 of the vehicle 2 is inevitably calculated incorrectly when it cannot be corrected on the basis of the GNSS signal 26, for example.

In the indoor carpark mentioned in the introduction, this correction is not possible because of the shielding of the GNSS signal 26. If a system restart is performed by the vehicle 2 in the indoor carpark parking space 4, it would thus be necessary to wait until the GNSS signal 26 was available and hence initial data 44 was available for calculating the actual position 20 on the basis of the iteration unit 40.

In order nevertheless to have the initial data 44 available immediately after the system restart of the vehicle 2, it is proposed in the present embodiment, as already mentioned, to save in a position memory 50 the last known actual position 20 prior to the system restart.

As already mentioned, however, it must be ascertained that the vehicle has not moved since the last known actual position 20 was saved in the position memory 50 until the system restart. This is achieved in the present embodiment, as already mentioned, by linking the actual position 20 saved in the position memory 50 and hence the initial data 44 to an image 34 of the surrounding area of the vehicle 2.

For this purpose, an image-capture unit 52 detects the image 34 and conditions it. Thus the image-capture unit 52 can use image processing to condition and convert the captured image 34, for example, or even recognize and classify specific objects in the image. The conditioned image 54 is then saved in an image memory 56.

In order to assign the conditioned image 54 to the actual position 20 saved in the position memory 50, the present embodiment provides a synchronization switch 58, which, for example, can be actuated by an engine control unit when the vehicle 2 is switched off, and can pass the actual position 20 to the position memory 50 and correspondingly the conditioned image 54 to the image memory 56.

At the system restart, the synchronization switch 58 remains in a position in which the conditioned image 54 is routed to a comparison unit 60. In this position of the synchronization switch 58, the actual position 20 of the vehicle continues to be ignored. The comparison unit 60 filters, for example by an aforesaid comparison, the saved image 62 in the image memory 56 and the conditioned image 54 from the image-capture unit 52, and calculates an error value between the two images 54, 62. If the error value drops below a predetermined threshold then the comparison unit 60 outputs a control signal 64, which it uses to enable the actual position 20 saved in the position memory 50 to be output via a 3*p* switch (which is not denoted by a reference sign) as the initial data 44 for the further calculation of the actual position 20 of the vehicle 2.

This ensures that incorrect initial data 44 is not used for calculating the actual position 20 of the vehicle 2 in the event of no GNSS signal 26 being present.

The invention claimed is:

1. A method for determining initial data for determining position data of a vehicle on a basis of vehicle-dynamics data, comprising:
in response to the vehicle being turned OFF, detecting a first ambient condition in proximity of the vehicle and associating the first ambient condition with a defined position of the vehicle,
in response to the vehicle being turned ON:
detecting a second ambient condition in the proximity of the vehicle,
comparing the first ambient condition to the second ambient condition, and
when the comparison satisfies a predetermined condition, using the defined position as initial data indicating a current position of the vehicle.

2. The method as claimed in claim 1, wherein the defined position of the vehicle is a position at which the vehicle is switched off.

3. A method as claimed in claim 2, wherein the detected ambient condition after the switching-off and a system restart of the vehicle is detected at the defined position.

4. The method as claimed in claim 1, wherein the defined ambient condition comprises at least a portion of an image of a surrounding area of the vehicle.

5. The method as claimed in claim 4, wherein the portion of the image of the surrounding area of the vehicle is detected by surround sensors.

6. The method as claimed in claim 5, wherein the portion of the image of the surrounding area of the vehicle is detected in a plane outside a movement plane of the vehicle.

7. The method as claimed in claim 5, wherein the portion of the image of the surrounding area of the vehicle is detected by means of object recognition.

8. The method as claimed in claim 4, wherein the portion of the image of the surrounding area of the vehicle is detected in a plane outside a movement plane of the vehicle.

9. The method as claimed in claim 8, wherein the portion of the image of the surrounding area of the vehicle is detected by means of object recognition.

10. The method as claimed in claim 4, wherein the portion of the image of the surrounding area of the vehicle is detected by means of object recognition.

11. A method for determining initial data for determining position data of a vehicle on a basis of vehicle-dynamics data, comprising:
in response to the vehicle being turned OFF, detecting a first ambient condition in proximity of the vehicle and associating the first ambient condition with a defined position of the vehicle,
in response to the vehicle being turned ON:
detecting a second ambient condition in the proximity of the vehicle,
comparing the first ambient condition to the second ambient condition, and
when the comparison satisfies a predetermined condition, using the defined position as initial data indicating a current position of the vehicle,
acquiring vehicle-dynamics data, and
updating the current position by extrapolating the initial data on the basis of the vehicle-dynamics data.

12. A control device, which is designed to implement a method for determining initial data for determining position data of a vehicle on the basis of vehicle-dynamics data, comprising:
in response to the vehicle being turned OFF, detecting a first ambient condition in proximity of the vehicle and associating the first ambient condition with a defined position of the vehicle,
in response to the vehicle being turned ON:
detecting a second ambient condition in the proximity of the vehicle,
comparing the first ambient condition to the second ambient condition, and
when the comparison satisfies a predetermined condition, using the defined position as initial data indicating a current position of the vehicle.

* * * * *